United States Patent
Kurien et al.

(10) Patent No.: US 10,051,191 B1
(45) Date of Patent: Aug. 14, 2018

(54) SYSTEMS AND METHODS FOR IMPROVED EXPOSURES WHEN PANNING

(71) Applicant: QUALCOMM Incorporated, San Diego, CA (US)

(72) Inventors: Deepak Kurien, San Diego, CA (US); Sunid Wilson, San Diego, CA (US); Haynes George, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/476,576

(22) Filed: Mar. 31, 2017

(51) Int. Cl.
   *H04N 5/225*   (2006.01)
   *H04N 5/232*   (2006.01)
   *H04N 5/235*   (2006.01)
   *G06T 7/246*   (2017.01)

(52) U.S. Cl.
   CPC ........... *H04N 5/2351* (2013.01); *G06T 7/248* (2017.01); *H04N 5/235* (2013.01); *H04N 5/23258* (2013.01)

(58) Field of Classification Search
   CPC .... H04N 5/3559; H04N 5/378; H04N 5/3745; H04N 5/3592; H04N 5/353; H04N 5/37457; H04N 5/37452; H01L 27/146
   See application file for complete search history.

(56) References Cited

U.S. PATENT DOCUMENTS

| | | | |
|---|---|---|---|
| 9,762,806 B2 * | 9/2017 | Nakata | H04N 5/2352 |
| 2008/0030522 A1 | 2/2008 | Dorbie et al. | |
| 2014/0119654 A1 | 5/2014 | Taylor et al. | |
| 2015/0286879 A1 | 10/2015 | Kanetake et al. | |
| 2016/0105595 A1 * | 4/2016 | Huang | H04N 5/238 348/363 |
| 2016/0266348 A1 | 9/2016 | Narayanan et al. | |
| 2016/0286109 A1 * | 9/2016 | Noda | H04N 5/238 |
| 2017/0270844 A1 * | 9/2017 | Sun | G06F 3/0416 |

FOREIGN PATENT DOCUMENTS

CN     1953515 A     4/2007

* cited by examiner

*Primary Examiner* — Hung Lam
(74) *Attorney, Agent, or Firm* — Pradice & Li LLP

(57) ABSTRACT

Methods and systems for predicting brightness of a scene are disclosed. The predictions are used to set exposure settings of an imaging sensor, such as exposure time or sensor gain. In one aspect, a method include capturing an image with the imaging sensor, determining a pan direction of the imaging sensor, predicting a brightness of a next image based on the pan direction, adjusting a gain or an exposure time of the imaging sensor based on the brightness prediction, and capturing the next image using the adjusted image sensor gain or exposure time.

22 Claims, 13 Drawing Sheets

SYSTEMS AND METHODS FOR IMPROVED EXPOSURES WHEN PANNING

BACKGROUND

Field

This technology relates to digital image processing, and in particular, to controlling image exposure settings, such as exposure time and sensor gain.

Description of the Related Art

Auto Exposure is a core processing element in camera architecture. Auto exposure automatically adjusts a camera's imaging sensor exposure or sensitivity settings under different lighting condition to achieve well-lit and balanced image frames. One problem with auto exposure compensation is that it determines exposure settings for a future image frame based on frame statistics taken from previous frames. When the scene is changing, a previous frame's statistics may or may not be appropriate for setting exposure settings of a subsequent frame. Accordingly, improvements in auto-exposure processing systems and methods are desired that provide more accurate exposure information when a scene is changing, for example, during panning a camera to follow a subject or when capturing a large target scene.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include reduced power consumption. One aspect disclosed is a method of setting image capture parameters for an imaging sensor. The method includes capturing an image with the imaging sensor, determining a pan direction of the imaging sensor, determining a brightness measurement of the image based on the pan direction, adjusting a gain or an exposure time of the imaging sensor based on the brightness measurement, and capturing a next image using the adjusted image sensor gain or exposure time.

In some aspects, the method includes assigning higher weights to image elements within a first region of the image than weights assigned to image elements within a second region of the image in response to a first pan direction. In some aspects, the method also includes assigning higher weights to image elements within the second region of the image than weights assigned to image elements within the first region of the image in response to a second pan direction.

In some aspects, the method also includes determining a position of the image in a three dimensional space, generating a second image by rotating the image in the three dimensional space based on the pan direction, projecting the second image onto the first image, assigning a weight to each of a plurality of regions of the first image based on an amount the projected second image overlaps the region; and determining the brightness measurement based on the assigned weights.

In some aspects, the method includes determining an area of the projected second image that overlaps with each region of the first image, and assigning the weights to each of the plurality of regions based on the area. In some aspects, determining the brightness measurement comprises applying a weighted convolution filter on luma values of image elements within each of the first and second regions according to the weights to determine a luma value for the image, and wherein the gain or exposure time is adjusted based on the luma value. In some aspects, the image includes image elements within a field of view and image elements outside the field of view, and the image elements within the first region and the second region are outside the field of view. In some aspects, the image elements outside the field of view are positioned in a contiguous portion of the image along four edges of the image.

In some aspects, the method includes determining a speed of the pan of the imaging sensor; and weighting the image elements based on the speed. In some aspects, the first and second regions are outside a field of view of the image, and the method further comprises excluding image elements outside a field of view of the image from the brightness measurement when no motion is detected. In some aspects, writing image elements within the field of view to a stable storage while excluding the image elements outside the field of view. In some aspects, determining the pan direction includes determining a pan direction along a first axis, and determining a second pan direction along a second axis, wherein the brightness measurement is further based on the first and second pan directions.

Another aspect disclosed is an apparatus for adjusting image capture settings for an imaging sensor. The apparatus includes a camera, the camera including an image sensor configured to capture one or more images, a motion sensor, configured to measure a pan direction of the image sensor, a hardware processor, configured to receive an image from the image sensor, determine a pan direction of the image sensor based on input from the motion sensor, determining a brightness measurement of the image based on the pan direction, adjust a gain or an exposure time of the image sensor based on the brightness measurement, and capture a next image with the image sensor using the adjusted image sensor gain or exposure time. In some aspects, the hardware processor is further configured to determine a position of the image in a three dimensional space, generate a second image by rotating the image in the three dimensional space based on the pan direction, project the second image onto the first image, assign a weight to each of a plurality of regions of the first image based on an amount of the projected second image that falls within the region, and determine the brightness measurement based on the assigned weights.

In some aspects, the hardware processor is further configured to: determine a luma measurement for each of the plurality of regions of the first image, and determining the brightness measurement for the image by averaging the luma measurements based on the assigned weights. In some aspects, the portion of the plurality of regions of the first image are within a field of view and a second portion of the plurality of regions is outside the field of view. In some aspects, the hardware processor is further configured to store the portion of the plurality of regions within the field of view to a stable storage device, while excluding the regions outside the field of view. In some aspects, projecting the second image onto the first image comprises projecting a portion of the second image onto a region outside a field of view of the first image, and assigning a weight to the region outside the field of view of the first image based on the portion of the second image being projected into the region outside the field of view.

Another aspect disclosed is a a non-transitory computer readable medium comprising instructions that when executed cause a hardware processor to perform a method of adjusting exposure settings of an imaging sensor. The method includes capturing an image with the imaging sensor, determining a pan direction of the imaging sensor, determining a brightness measurement of the image based on the pan direction, adjusting a gain or an exposure time of the imaging sensor based on the brightness measurement, and capturing a next image using the adjusted image sensor gain or exposure time.

BRIEF DESCRIPTION OF THE DRAWINGS

The various features illustrated in the drawings may not be drawn to scale. Accordingly, the dimensions of the various features may be arbitrarily expanded or reduced for clarity. Furthermore, dotted or dashed lines and objects may indicate optional features or be used to show organization of components. In addition, some of the drawings may not depict all of the components of a given system, method, or device. Finally, like reference numerals may be used to denote like features throughout the specification and FIGs.

DETAILED DESCRIPTION

Figure 1:
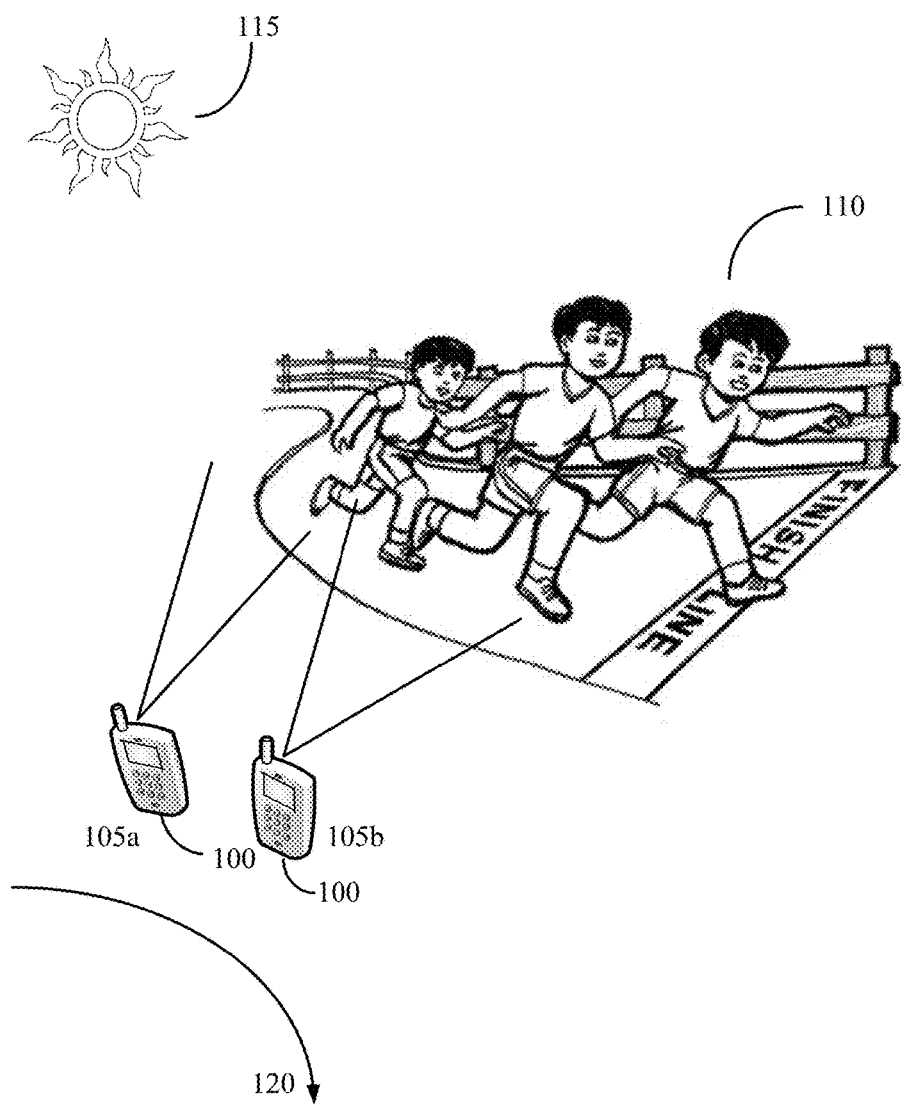
FIG. 1 is an overview diagram of an imaging device 100 capturing multiple images of a target scene.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Furthermore, although particular aspects are described herein, many variations and permutations of these aspects fall within the scope of the disclosure. In addition, the scope of the disclosure is not intended to be limited to particular the benefits, uses, or objectives disclosed herein. Rather, aspects of the disclosure are intended to be broadly applicable to different wired and wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The "luma" of an image (which may also be referred to herein as a "frame") is a measure of the brightness of the image (or a brightness level), that is, the achromatic portion of the image. The luma of an image or frame is affected by the particular exposure characteristics used to capture the frame, which include characteristics of components that allow light to propagate to, and be incident on, a sensor (e.g., aperture, optics, f#, exposure time, etc.) and the sensitivity of the sensor. If the components through which light propagates to the sensor remain the same (e.g., at a certain lens zoom level), the luma is affected by the duration (time) of the exposure and the sensitivity of the sensor, which can be generally referred to as a set of sensor exposure settings. The luma of a frame may be computed by dividing the entire frame into a grid having N rows and M columns. Brightness of each cell in the grid may then be averaged to determine a brightness level of the frame as a whole. The brightness information may be provided to an exposure control system that adjusts one or more of an exposure time and/or sensor gain based on the brightness setting. For example, if the brightness is relatively high (above a threshold), a shorter exposure time (below an exposure time threshold) may be appropriate. Alternatively, the gain of the imaging sensor may be set to a relatively lower value (below a gain threshold). When the detected brightness is relatively low (below a brightness threshold), the exposure time may be increased (above an exposure time threshold), or the gain of the sensor may be increased (to above a gain threshold).

Setting the exposure setting in this way can result in the exposure settings lagging behind the lighting conditions experienced by the imaging sensor, especially when the camera is in motion. For example, if a user is panning the imaging device in a direction from relatively low scene brightness to a second scene of relatively high scene brightness, exposure settings may be determined for the scene with the relatively low brightness. When the image is captured, the image sensor may experience a scene with relatively higher brightness. The disclosed methods and systems provide prediction of scene brightness levels based on a direction of movement of an imaging sensor.

FIG. 1 is an overview diagram of an imaging device 100 capturing multiple images of a scene. FIG. 1 shows the imaging device 100 at two different relative positions 105a-b at two different points of time. The imaging device 100 is capturing images of scene 110 in each of position 105a and 105b. The scene 110 may be illuminated by a light source, such as the sun 115. In other embodiments, the light source may be another light source. Some scenes may be illuminated by multiple light sources, for example, the sun and one or more "artificial" light sources, e.g., a flash device, or an incandescent, fluorescent, or LED light source.

Due at least in part due to a position of the light source 115 relative to the scene 110, an imaging sensor in the device 100 may sense different levels of scene brightness when capturing an image from position 105a as compared to capturing an image from position 105b. For example, from position 105a, the imaging sensor on the device 100 is positioned or oriented to capture an image of the scene 110 in a direction that is more directly into (or towards) the light source 115 compared to the position or orientation when the device 100 captures an image from the position 105b. Note that in some aspects, a variation in scene brightness of captured frames may also be caused by differences in an amount of light reflected from objects (e.g., buildings, bodies of water) in the scene itself when the imaging device 100 is located or oriented at different positions, such as positions 105a and 105b.

The disclosed methods and systems provide for predicting a scene's brightness (such as scene 110) from a first position (such as position 105b) based on a scene captured from a second position (such as position 105a), and one or more measurements from a motion sensor. For example, after the imaging device 100 captures the scene 110 from the position 105a, a user of the imaging device 100 may pan or rotate the device 100 in the direction of the arrow 120 so as to be in the position 105b, in order to capture a different perspective of the scene 110. The movement of the device 100 from position 105a to 105b may be detected by a motion sensor, which will measure accelerations during the rotation. The rotation or panning of the imaging device 100 may also cause the scene brightness to change. For example, as the device 100 pans away from the light source 110 as it moves from position 105a to position 105b, the brightness of the scene may be reduced when an image is captured at position 105b relative to an image captured at positon 105a.

The disclosed methods and system may predict a decrease in the brightness of the scene captured at position 105b relative to position 105a based on a distribution of brightness within the pixels of the image captured at position 105a. For example, if imaging elements closer to the direction 120 of pan within the image captured at position 105a exhibit lower brightness than imaging elements in the opposite direction 120 of the pan, then the disclosed methods and systems may predict a brightness setting lower than a brightness setting that would provide equal weight to imaging elements in an image captured at position 105a.

Figure 2:
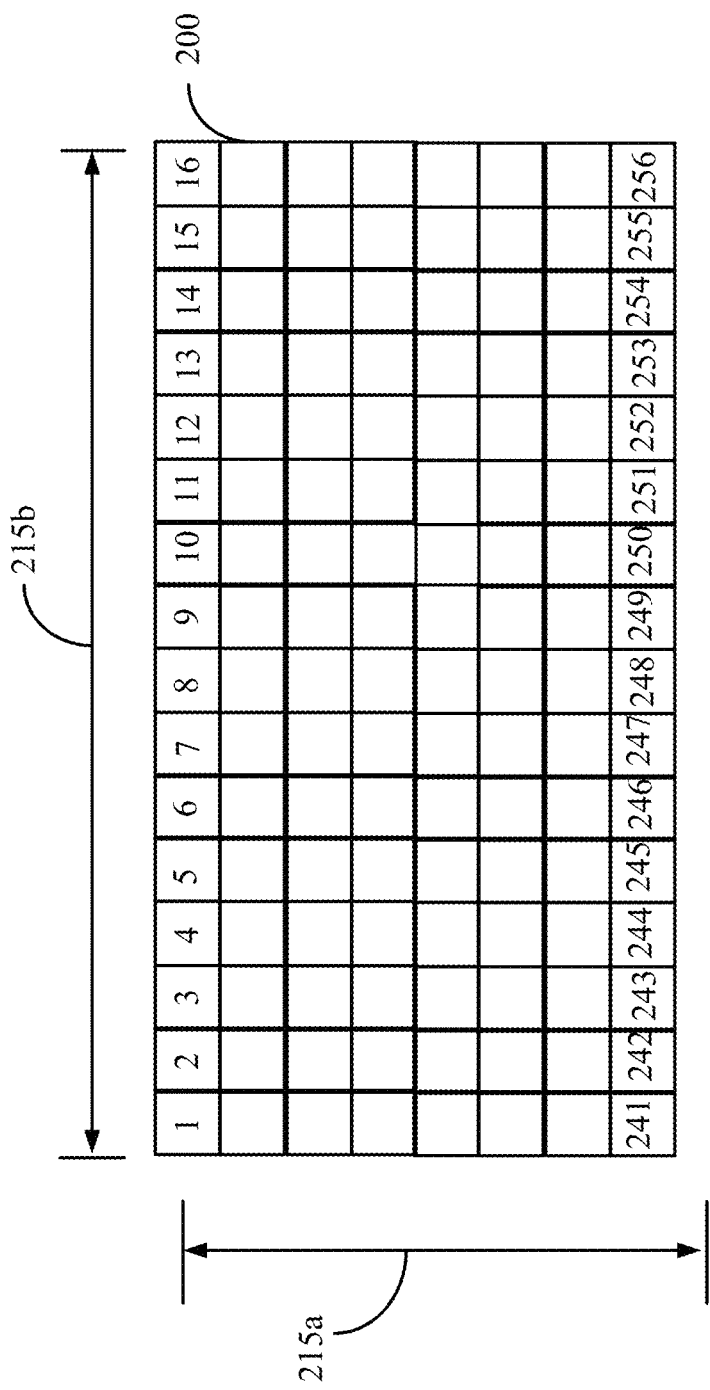
FIG. 2 shows illustrates an exemplary portion of an image element array 200 of an imaging sensor
Figure 3:
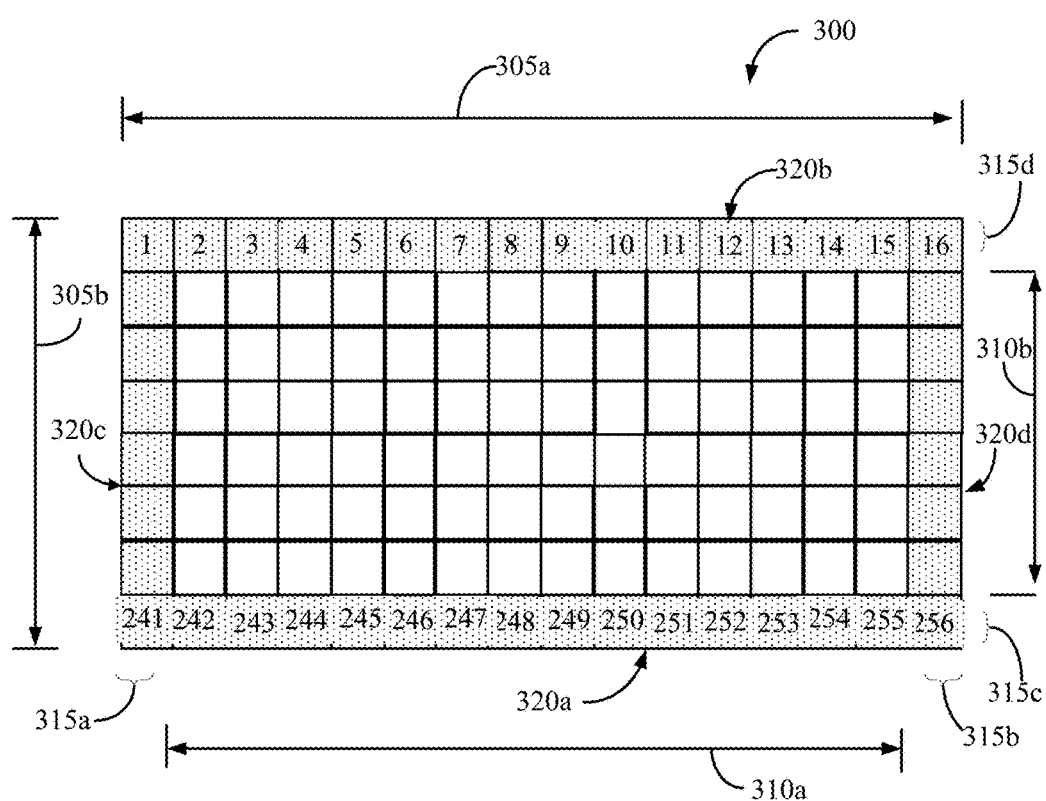
FIG. 3 shows another exemplary configuration of an imaging sensor.
Figure 4:
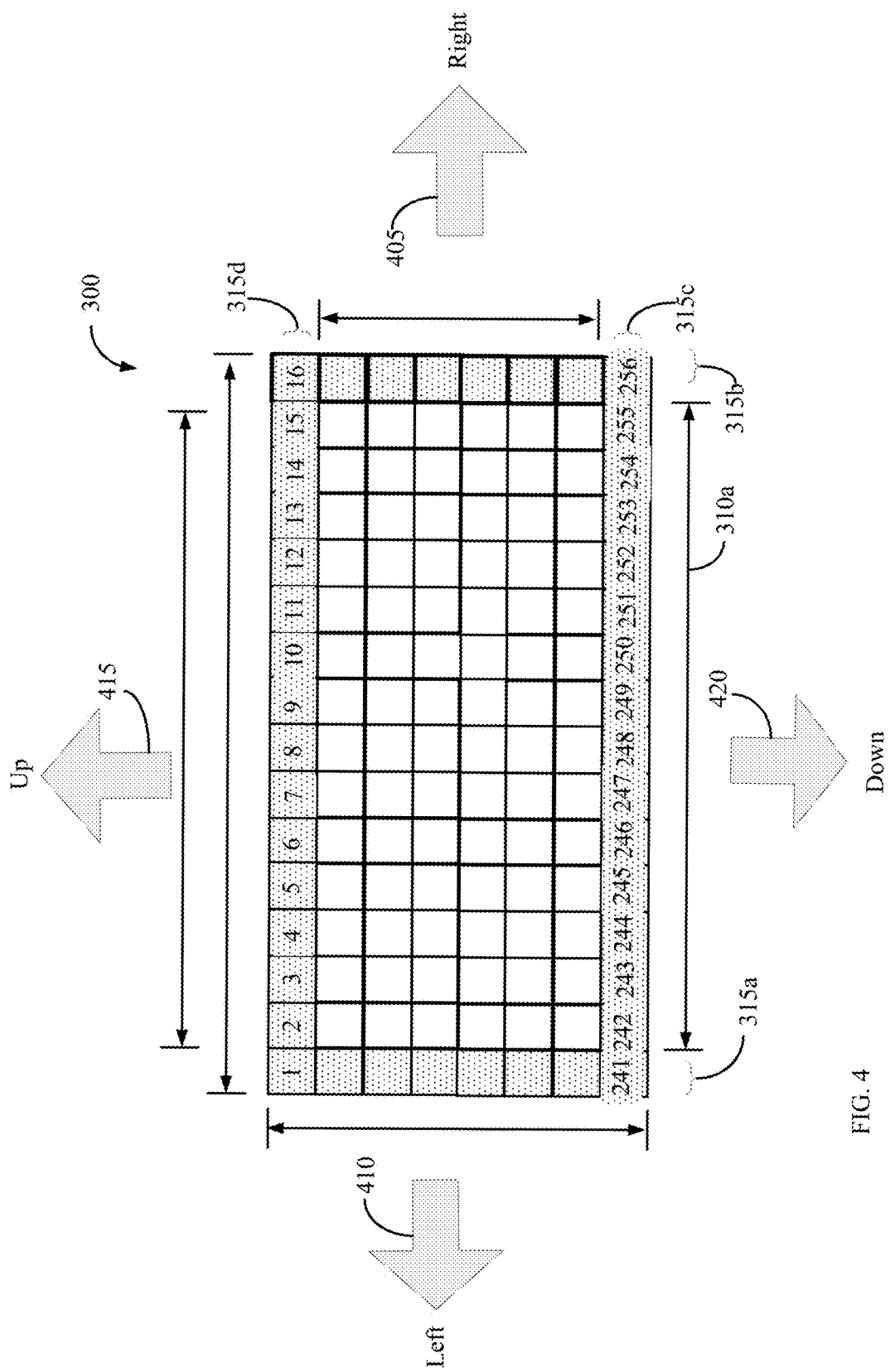
FIG. 4 also shows the exemplary configuration of an image element array 300 of an imaging sensor of FIG. 3.

FIG. 2 illustrates an exemplary portion of an image element array 200 of an imaging sensor, which is used with the illustration is FIGS. 3 and 4 to show certain aspects of the described embodiments. The particular size of the image element array 200 is merely an example, and most image element arrays in imaging devices will be much larger. The imaging element array 200 shows a configuration of image elements organized into rows and columns. In the exemplary embodiment of FIG. 2, an entire portion of the imaging element array 200 may be within a field of view of a scene captured by the image element array and provided as an image, for example, to a user application. In this example, the illustrated imaging element array 200 represents a 16×16 image element configuration. In some aspects, all 256 of these image elements may be utilized to represent a scene captured by the imaging sensor. In other words, the signals (or information) produced by the image elements within the dimensions shown as 215a-b as a result of light being incident on the image elements may be used to form an image generated by the image element array 200.

FIG. 3 shows another exemplary configuration of an imaging sensor. In the exemplary configuration 300 shown in FIG. 3, an exemplary imaging element array 300 includes 256 image elements, arranged in a 16×16 configuration, in a similar manner as that of imaging element array 200 of FIG. 2. The imaging element array of FIG. 3 includes marginal regions, shown as imagining elements in either columns 315a-b or rows 315c-d. Each row and column 315a-d may be considered a separate region, resulting in four total regions. The regions may be comprised of contiguous image elements, arranged in single or multiple rows and columns.

The regions may overlap, for example, in a corner region of the image element array. Although the marginal region columns 315a-b and rows 315c-d are illustrated as being of a certain size (e.g., 1×16) in this example, other size marginal regions are also contemplated, and such marginal regions may be of similar size or of a dissimilar size. For example, in some embodiments the width of the marginal region columns may be larger, or smaller, than height of the marginal region rows, or vice-versa. As shown in FIG. 3, a region may be positioned to run along an edge of the image element array. For example, row 315c runs along the "bottom" edge 320a of the image element array 300, row 315d runs along the top edge 320b of the image element array 300. Column 315a runs along a left edge 320c of the image element array 300, and column 315b runs along a right edge of the image element array 300. In some aspects, image elements in the marginal regions, and outside the field of view, may be positioned in a contiguous portion of the image along the four edges of the image element array.

The marginal regions are shown as shaded image elements. The marginal regions are outside a field of view of an image captured by the imaging elements 300. Thus, while the imaging sensor 300 includes a total set of imaging elements as shown by the dimensions 305a-b, the image elements included in the field of view of a captured image of a scene (that is, the image elements that were used to produce the captured image) includes fewer image elements. An exemplary set of imaging elements included in a field of view is shown by dimensions 310a-b. A set of image elements in the field of view may be the image elements that are not part of any marginal region.

A set of image elements outside the field of view, shown as image elements in rows and columns 315a-d, may be used for brightness prediction in some aspects of the disclosed methods and systems. For example, when the imaging sensor is in motion, image elements within the rows and columns 315a-d may be given unequal weights when predicting brightness. In some aspects, when no imaging sensor motion is detected, the image elements in the rows and columns 315a-d may be given equal weight, or may not be utilized in brightness prediction.

FIG. 4 also shows the exemplary configuration of an image element array 300 of an imaging sensor of FIG. 3. FIG. 4 shows four regions of marginal image elements, as 315a-c. Marginal image elements may not be included in a field of view of the imaging sensor. In other words, luma values of the marginal image elements may not be included in an image produced by the imaging element array 300 when that image is provided to another component. Alternatively, marginal image elements may be filtered out of the image by a component of a downstream image pipeline component.

A marginal region of image elements may run across an entire length (e.g. columns 315a-b) or width (e.g. columns 315c-d) of an image element array. The region may be any number of image elements wide (in a dimension perpendicular to the dimension upon which it runs across the image element array). In the example of FIG. 4, the four regions of marginal image elements are shown as each being one image element wide. However, other widths are contemplated. For example, the disclosed methods and systems contemplate a width of image elements in a marginal region of any width, for example, one (1), two (2), three (3), four (4), five (5), six (6), seven (7), eight (8), nine (9), ten (10), 25, 50, 100, or any number of image elements In some aspects, the image elements in the margin regions make up 5, 10, 15, 20, or 25 percent of all the image elements of the imaging sensor 300. The region of elements in row 315c may be considered to be on an opposite side of the image array 300 than the row of image elements 315d. Similarly, the region of elements in column 315a may be considered to be on an opposite side of the image element array 300 than column 315b. Regions 315a-b are perpendicular to regions 315c-d, as rows and columns are generally known to be perpendicular to each other. FIG. 4 also shows four directions, labeled as right 405, left 410, up 415, and down 420. While these labels may be assigned in an arbitrary manner, and could vary by embodiment, they are provided for ease of description and conform with established meanings of those terms by one of ordinary skill in the art. For example, the disclosed embodiments function in a substantially similar manner if the image element array 300 were turned upside down, reversing the top/bottom notation. Similarly, the disclosed embodiments function in a substantially similar manner if the image element array 300 is turned 180 degrees horizontally, which may reverse the left/right notation. The left arrow 410 is positioned on the same side of the image element array 300 as the region (left column) 315a. The right arrow 405 is positioned on the same side of the image element array 300 as the region (right column) 315b. The bottom region (bottom row) 315c is positioned proximate to the down direction arrow 420, and the top region (top row) 315d is positioned proximate to the up direction arrow 415.

FIG. 4 illustrates that when an imaging device is panning in a certain direction, for example, the direction indicated by the arrow 405, an imaging device may be able to detect the direction of motion using an accelerometer and/or gyro sensor. Using this information, exposure control logic in an imaging device may weigh image elements closer to the direction of movement indicated by the arrow 405 (e.g. image elements in column 315b for example) more heavily than image elements opposite the direction of pan (e.g. image elements in column 315a).

Similarly, if the imaging device pans in the direction indicated by arrow 410, the disclosed methods and systems may weight image elements in column 315a more heavily than image elements in column 315b. In some aspects, a weighted convolution filter of the luma within each of the image elements of imaging sensor 300 may be utilized. In these aspects, the weight of the weighted convolution filter may be determined based on whether the imaging sensor is panning in the direction of arrow 405 or the direction of arrow 410. Once the panning stops, exposure control logic of the disclosed methods and systems may utilize only the image elements within dimensions 310a-b. When no motion is detected, image elements in column 315 and 315b may not be utilized to predict brightness.

While the discussion of FIG. 4 thus far has described movement in the horizontal direction, as shown by arrows 405 and 410, the disclosed methods and systems may also predict brightness when motion is in a vertical or up or down direction, as shown by arrows 415 and 420 respectively. For example, if the disclosed methods and systems detect motion according to arrow 415, they may weigh image elements in row 315d more heavily than image elements in row 315c. If the disclosed methods and systems detect motion according to arrow 420, the may weigh image elements in row 315c more heavily than image elements in row 315d. These aspects may also employ a weighted convolution filter when determining brightness, with the weight determined by the direction of motion.

In some aspects of the disclosed embodiments, a speed of a pan may determine weights used when determining a brightness measurement of the image element array 300. In some of these aspects, weights of marginal regions of image elements positioned along an edge of the image element array that is also in the direction of the pan may be proportional to the speed of the pan. For example, in some aspects, if a pan is to the right (direction of arrow 405) and a speed of the pan is above a threshold, a first weight is assigned to the image elements in column 315b, otherwise, a second lower weight is assigned to the image elements in column 315b. In some aspects, weights of marginal regions on a side of the image array opposite a pan direction may be inversely proportional to the pan speed. For example, a lower weight may be applied to column 315a when a speed of a pan to the right is above the threshold, and a higher weight may be applied to column 315a when the speed of the pan is below the threshold. Some embodiments may operate similarly with respect to other pan directions, and the description with respect to columns 315a-b should be understood to be only examples to demonstrate how some embodiments may operate.

Figure 5:
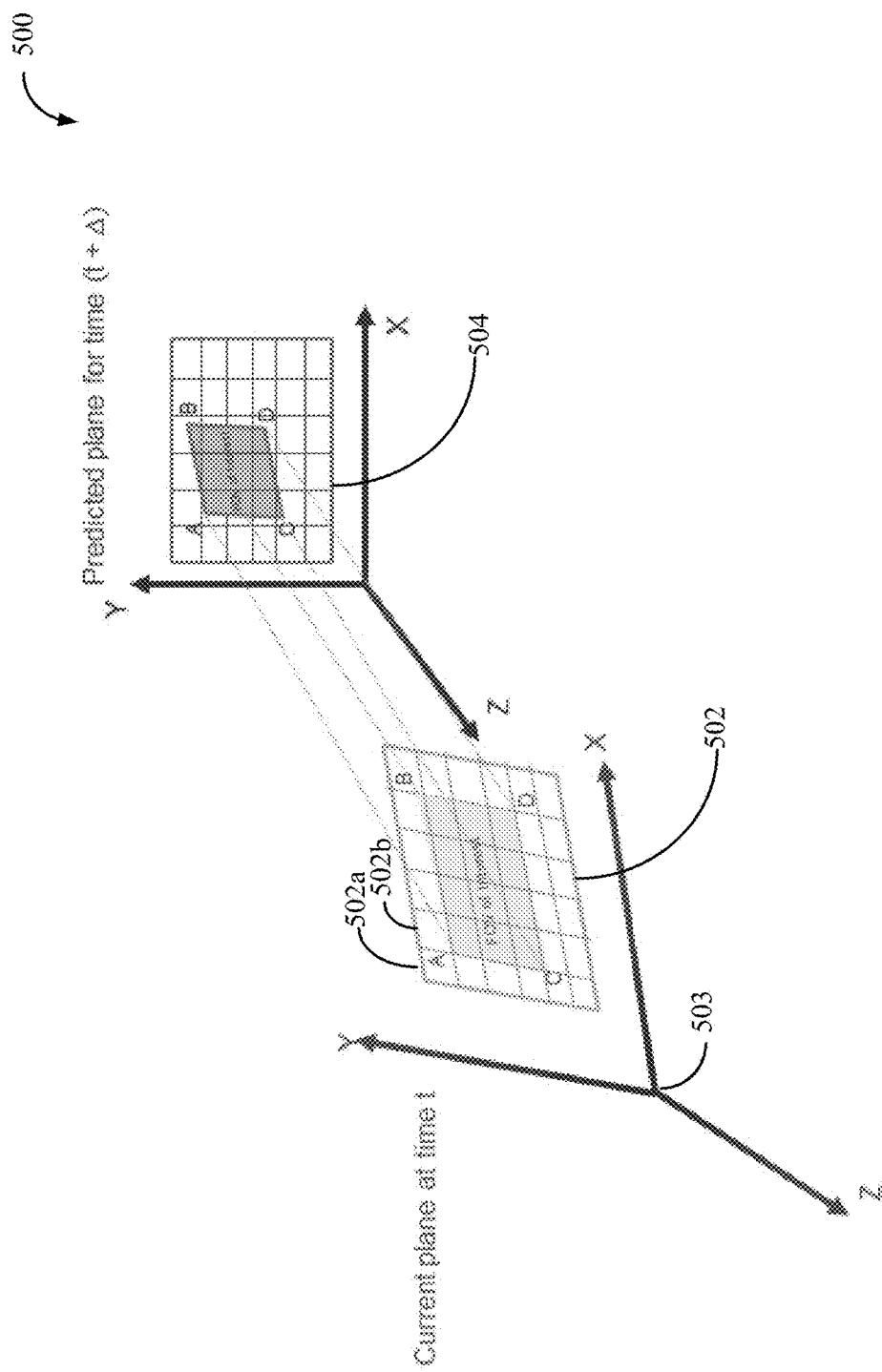
FIG. 5 shows the rotation of a first image on a first image plane into a second image on a different image plane.

FIG. 5 illustrates projection of an image from a first plane to a second plane based on information from a gyro and/or an accelerometer. FIG. 5 shows a first image 502 within a three dimensional space 503. The first image is divided into a plurality of regions, shown as, for example, regions 502a-b (all regions not labeled to preserve figure clarity).

Based on input from the gyro and/or an accelerometer (not shown), the first image 502 may be projected into a second orientation, as shown by the second image 504. Differences between the first image 502 orientation and the second image 504 orientation may be based on the input. The orientations of the first image 502 and the second image 504 may be utilized in the disclosed systems and methods to determine weights for each of the plurality of regions of the first image 502 (e.g. 502a-b) when generating a luma estimate for the image 502. The luma estimate for the image 502 may be utilized to set one or more image capture parameters of an imaging sensor for an image captured subsequent to the first image 502.

Figure 6:
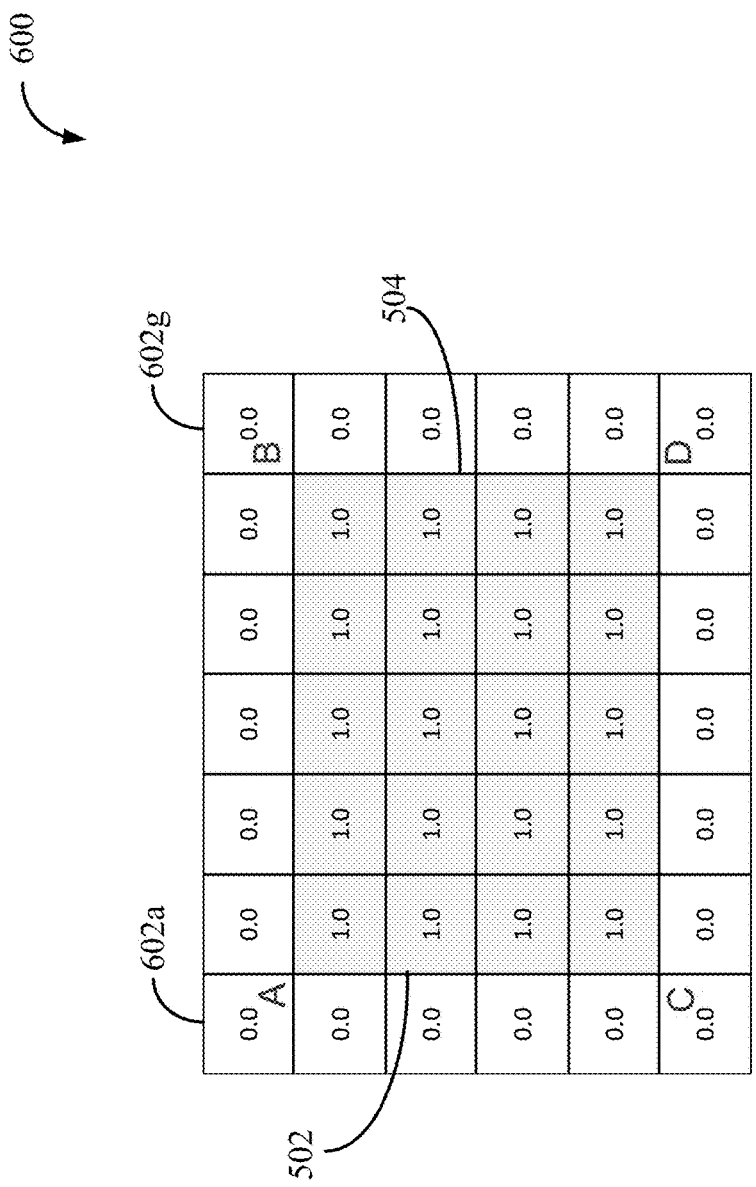
FIG. 6 shows a projection of a second rotated image onto a first image when no motion is present.

FIG. 6 shows weights associated with regions of an image element array 600. The image element array 600 includes a plurality of regions. For example, only regions 602a and 602g are labeled to preserve figure clarity. A portion of the regions 602 are within a field of view of the image element array 600. The field of view is shown in FIG. 6 via the shaded regions. A second portion of the regions are outside the field of view of the image element array 600. This second portion is shown as unshaded regions. In some aspects, regions within the field of view may be displayed on a display device, while regions outside the field of view may be excluded from display. Similarly, regions within the field of view may be stored to a stable storage, such as a hard disk, network disk, or the like. These regions may then make up an image utilized by other processes, such as image viewers or the like. Regions outside the field of view may be excluded from these storage operations in some aspects.

When the image element array is at rest, a projection of a first image to a second image based on information from a gyro or accelerometer may result in the second image overlaying the first image. For example, referring back to FIG. 5, the second image 504 may completely overlay the image 502 when no motion is present.

Thus, in FIG. 6, which shows an image element array at rest, a projection of a first image, for example, an image defined by the corners A, B, C, and D, onto a second image, results in a second image that completely overlays the first image. Thus, in FIG. 6, it appears that only one image is present. Since each region within the field of view of the first image is completely overlaid by a corresponding region of the second image (e.g. 504 in FIG. 5), weights of one (1.0) are assigned to each image element Because each image element of the first image is equally overlaid by the second image, all of the image elements have the same weight.

Thus, in the example embodiment of FIG. 6, a weight of one (1) is assigned to each image element within the field of view. When the image element array 600 is at rest, no weight (i.e. a weight of zero (0) is given to image elements outside the field of view).

Figure 7:
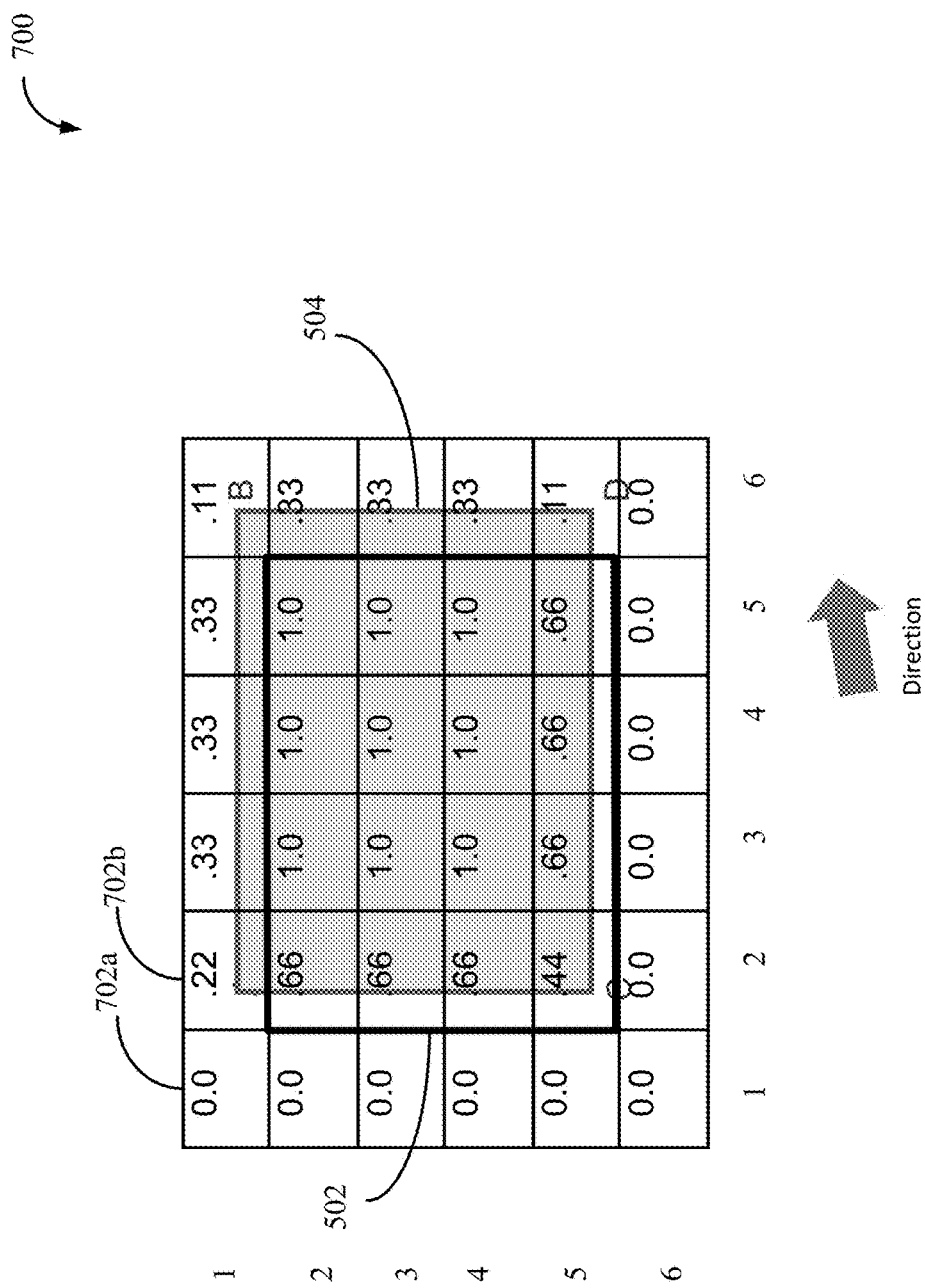
FIG. 7 shows a projection of a second rotated image onto a first image when motion up and to the right is present.

FIG. 7 shows weights assigned to regions of an image element array 700. The image element array 700 includes a plurality of regions. Only regions 702a-b are labeled to preserve figure clarity. Regions may also be identified using row and column numbers, shown as rows 1-6 and columns 1-6 in FIG. 7.

FIG. 7 also shows a field of view of a first image 502, and a projection of the first image 502 into a second orientation 504 based on input from a gyro and an accelerometer. In contrast to the image element array 600 which was at rest in FIG. 6, the image element array 700 is not at rest. Thus, the image 504 is offset from the image 502 in FIG. 7.

In the disclosed methods and systems, weights may be assigned to each region of the image element array 700 based on a percent of overlap between a region of the image element array 700 and the image 504. Thus, identifying the regions of image element 700 by row and column number, region (2, 2), is 66% overlaid by the image 504. Thus, region (2,2) is assigned a weight of 0.66. region (1,2), which is outside the field of view of the image 502, is assigned a weight of 0.22, as it is 22% overlaid by the image 504. Region (2, 6), which is also outside the field of view of image 502, is assigned a weight of 0.33, since it is 33% overlaid by the image 504. Each of the regions of the image element array 700 may be assigned a weight based on a percentage overlap with the image 504.

The weights assigned to each region may then be utilized when generating a luma measurement. For example, a luma measurement may aggregate luma measurements for each of the regions, while discounting each region by its assigned weight.

Figure 8:
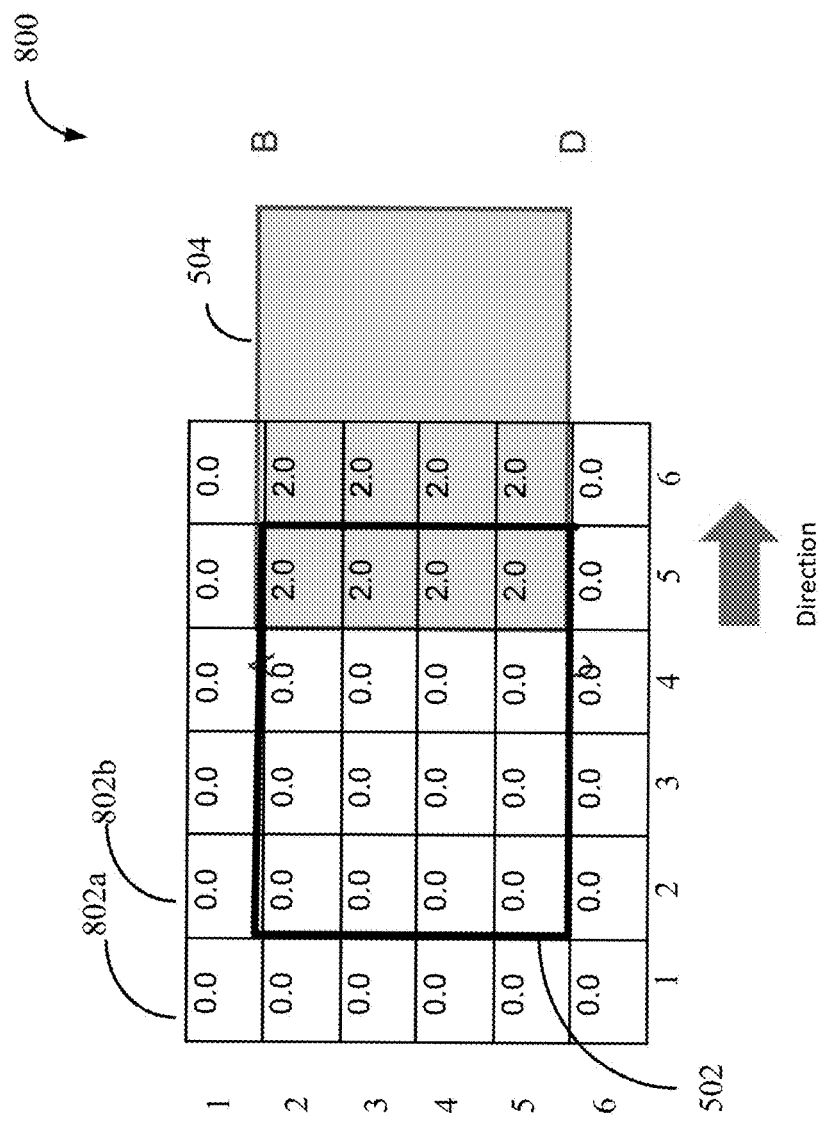
FIG. 8 shows a projection of a second rotated image onto a first image when strong motion to the right is present.

FIG. 8 shows weights assigned to regions of an image element array 800. The image element array 800 includes a plurality of regions. Only regions 802a-b are labeled to preserve figure clarity. Regions may also be identified using row and column numbers, shown as rows 1-6 and columns 1-6 in FIG. 8.

FIG. 8 also shows a field of view of a first image 502, and a projection of the first image 502 into a second orientation 504 based on input from a gyro and an accelerometer. The image element array 800 is not at rest, resulting in the image 504 being offset from the image 502 in FIG. 8.

As discussed above, in the disclosed methods and systems, weights may be assigned to each region of the image element array 700 based on a percent of overlap between a region of the image element array 800 and the image 504. The example of FIG. 8 differs from that of FIG. 7 however, in that some image elements within the field of view, and image 502, have no overlap with the image 504. This may be the result of substantial motion of the image element array 800, as compared to, for example, the motion present in the example of FIG. 7.

Identifying regions of image element 800 by row and column number, each o regions (2,5), (2, 6), (3, 5), (3, 6), (4, 5), (4, 6), (5, 5), (5, 6), have 100% overlap with the image 504. None of the other regions of the image element array have any overlap with the image 504. Further note that there are sixteen image elements within the image 502 and the field of view of the image element array 800. If the image element array 800 were not in motion, each of the image elements within the field of view would be provided with a weight of one (1), for a total weight of sixteen (16). The disclosed methods and systems may allocate the sixteen (16) weight values to the regions having at least some overlap with the image 504. Since in the example of FIG. 8, eight (8) regions have 100% overlap with the image 504, this sixteen (16) weight values are allocated equally to the eight regions, such that each region receives a weight of two (2).

Figure 9:
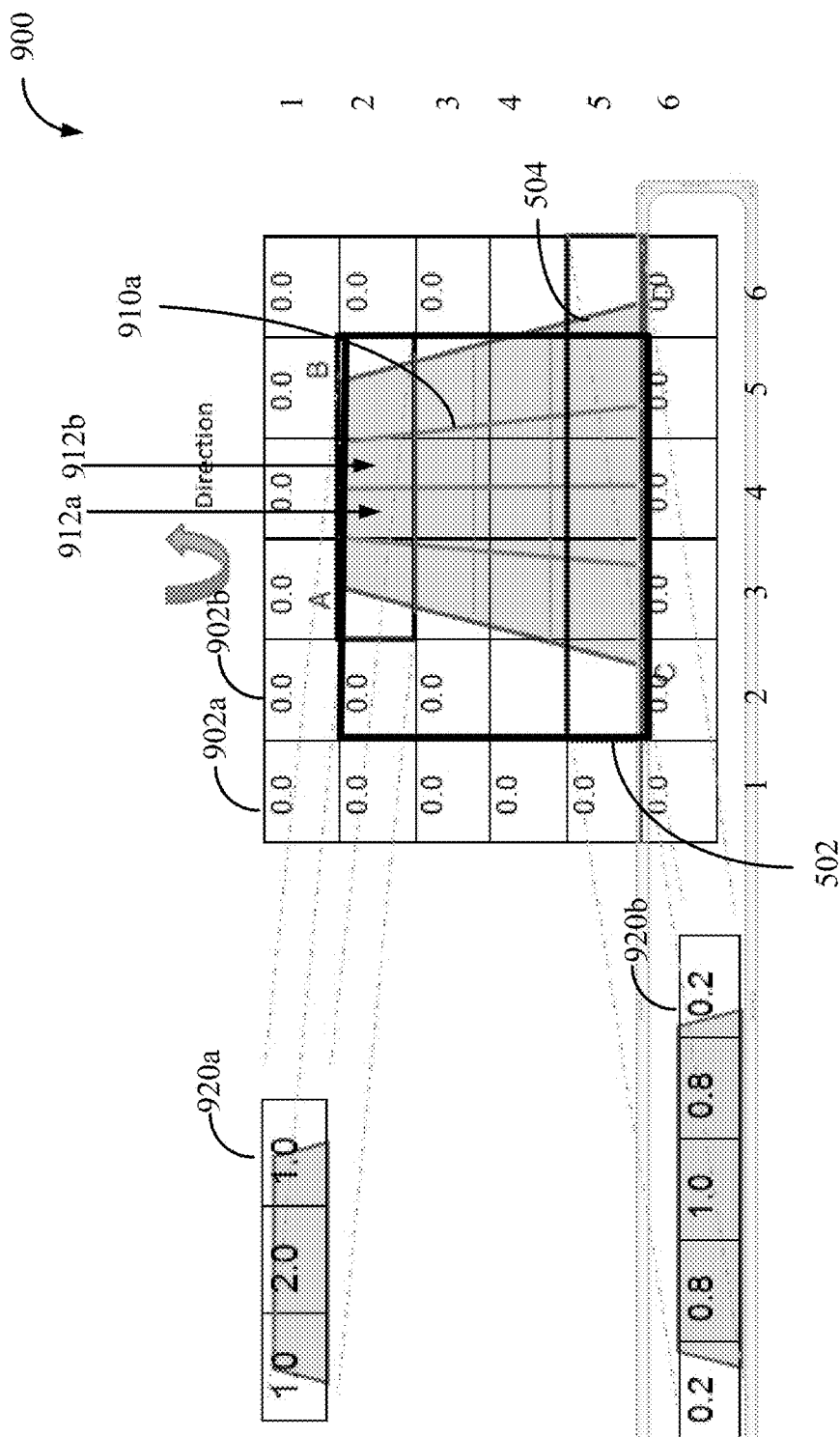
FIG. 9 shows a projection of a second rotation image onto a first image when rotation about a z axis is present.

FIG. 9 shows weights assigned to regions of an image element array 900. The image element array 900 includes a plurality of regions. Only regions 902a-b are labeled to preserve figure clarity. Regions may also be identified using row and column numbers, shown as rows 1-6 and columns 1-6 in FIG. 9.

FIG. 9 also shows a field of view of a first image 502, and a projection of the first image 502 into a second orientation 504 based on input from a gyro and an accelerometer. The image element array 900 is not at rest, resulting in the image 504 being offset from the image 502 in FIG. 9. The lines shows within the projected image 504, (ex. line 910a) visualize that the image 502 is being rotated into a non-parallel plane as the image 504. Thus, in the example rotation of the image 504 relative to the image 502 in FIG. 9, two regions of the image 504, shown as 912a-b overlap the region (2,4) of image 502.

Also shown in FIG. 9 are two expanded views 920a-b. Expanded view 920a shows regions (2, 3), (2, 4), and (2, 5) of image 502 overlaid with portions of image 504. Expanded view 920b shows regions (5, 2), (5, 3) (5, 4,), (5, 5), and (5,6) overlaid with portions of image 504.

Expanded view 920a shows weights assigned to each of the regions (2,3), (2,4), and (2,5) as 1.0, 2.0, and 1.0 respectively. Expanded view 920b shows weights assigned to each of regions (5, 2), (5, 3) (5, 4,), (5, 5), and (5,6) as 0.02, 0.8, 1.0, 0.8, and 0.2 respectively.

As discussed above, in the disclosed methods and systems, weights may be assigned to each region of the image element array 900 based on a percent of overlap between a region of the image element array 800 and the image 504. The example of FIG. 8 differs from that of FIG. 7 however, in that some image elements within the field of view, and image 502, have no overlap with the image 504. This may be the result of substantial motion of the image element array 800, as compared to, for example, the motion present in the example of FIG. 7.

Figure 10:
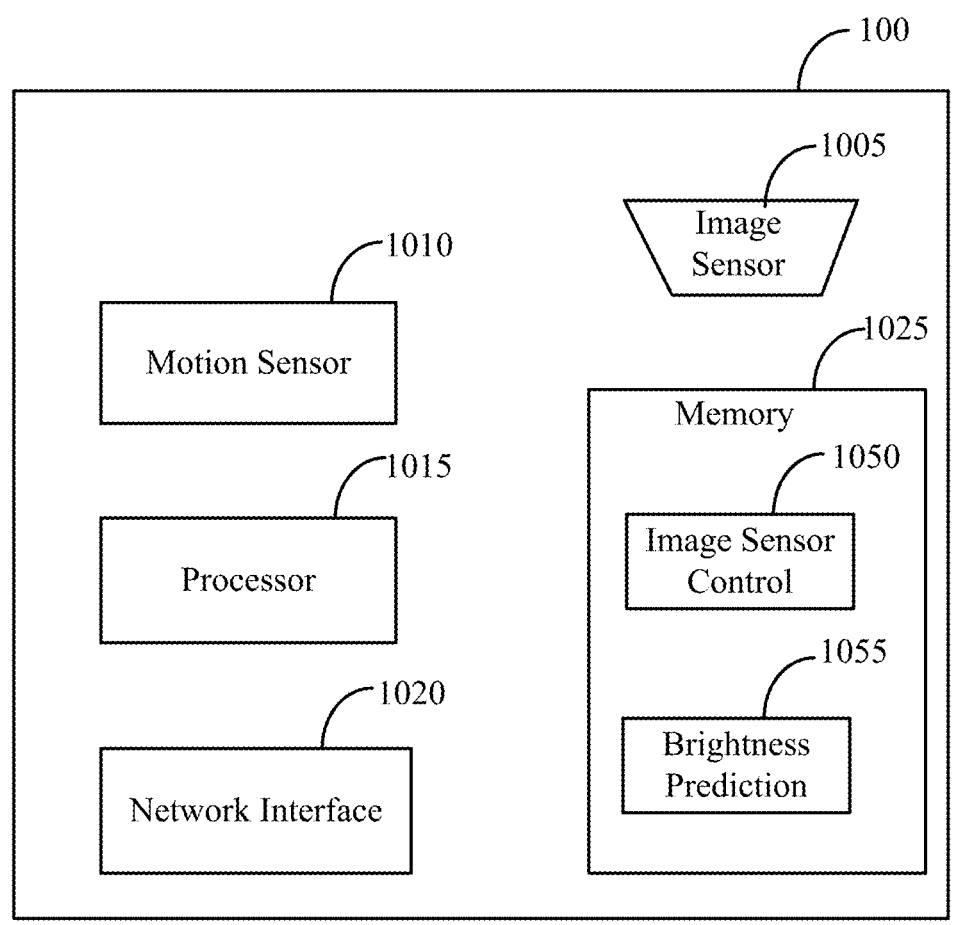
FIG. 10 is an exemplary block diagram of a device that may implement one or more of the disclosed embodiments.

FIG. 10 is an exemplary block diagram of a device that may implement one or more of the disclosed embodiments. The device 100 includes an imaging sensor 1005, motion sensor 1010, electronic hardware processor 1015, network interface 1020, and an electronic hardware memory 1025. The components of the device 100 shown in FIG. 10 may be operably connected to each other via a hardware bus in some aspects. The electronic hardware memory 1025 stores instructions for the processor 1015. The instructions configure the processor to perform one or more functions of the methods and processes described herein. The motion sensor 1010 may include one or more of an accelerometer and a gyro. In some aspects, the motion sensor may be configured to detect movement in at least two or more dimensions. For example, as discussed above with respect to FIG. 4, motion about a vertical axis in either a left or right direction may cause the image elements in columns 315*a-b* to receive different weights when determining a brightness value (e.g. luma value) for the imaging element array 300. Similarly, motion about a horizontal axis in either the up or down direction of FIG. 4 may cause the image elements in rows 315*c-d* to receive different weights when determining a brightness value (e.g. luma value) for the imaging element array 300.

In some aspects, the network interface 1020 may provide network connectivity for the device 100 via a wireless or wired network. For example, in some aspects, the device 100 may be a cell phone or smart phone that is able to communicate over a cellular or WiFi (e.g. IEEE 802.11) network. In some aspects, the device 100 may be a camera or may include a camera.

Figure 11:
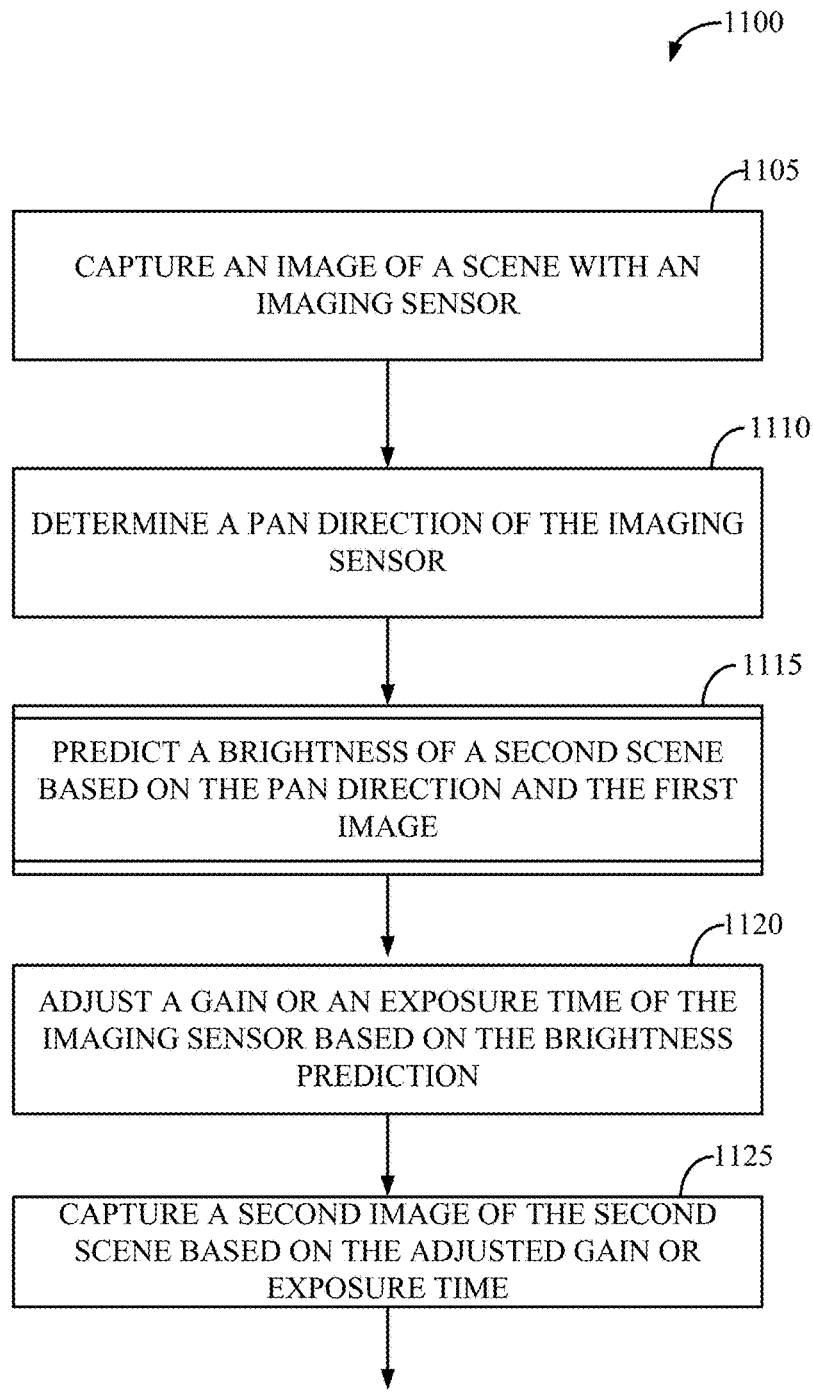
FIG. 11 is a flowchart of a method for predicting brightness of an exposure.

FIG. 11 is a flowchart of a method of setting image capture parameters for an imaging sensor. In some aspects, the process 1100 discussed below with respect to FIG. 11 may be performed by an electronic hardware processor. For example, in some aspects, instructions in the memory 1025 may configure the processor 1015 to perform one or more of the functions discussed below with respect to process 1100 and FIG. 11.

In block 1105, a first image is captured by an imaging sensor. For example, the imaging sensor 1005 may be utilized in some aspects. The first image may be captured using particular exposure settings, for example, an exposure time and/or a sensor gain, which may adjust a sensitivity of the imaging sensor to light.

In block 1110, a pan direction of the imaging sensor is determined. For example, in some aspects, the motion sensor 1010 of FIG. 10 may record motion of the device 100 and/or imaging sensor 1005. The motion sensor 1010 may determine whether the device is experiencing no motion, or motion in two or fewer directions indicated by the arrows 405, 410, 415, and 420 of FIG. 4.

In block 1115, a brightness of a second scene may be based on the pan direction determined in block 1110. As discussed above with respect to FIG. 4, in some aspects, image elements within a marginal area of the imaging sensor, outside the field of view of an image, may be used in the brightness determination. These image elements may be given different weights in the brightness determination based on whether they are on a side of the imaging sensor that is closer to the direction of pan or further from the direction of pan. Thus, if the pan direction is to the right, image elements positioned within a right side margin of the imaging sensor may be weighted more heavily than image elements positioned within a left side margin of the imaging sensor. Similarly, if the pan direction is to the left, image elements positioned within a left side margin of the imaging sensor may be weighted more heavily than image elements positioned with a right side margin of the imaging sensor. If no motion is detected in block 1110, the image elements within the marginal region may not be considered when predicting brightness in block 1115. One embodiment of block 1115 is described below with respect to FIG. 12. Another embodiment of block 1115 is described below with respect to FIG. 13.

In some aspects, block 1115 may utilize a weighted convolution filter, with the weights of the image elements of the imaging sensor being determined as described above and with respect to process 1115 described below with respect to FIG. 12. When describing that a brightness of a scene may be based on a pan direction, block 1115 does not imply that by panning an imaging sensor, the imaging sensor may image a scene having a different brightness, and thus, because the new scene has a different brightness, that the brightness of the second scene is based on the pan direction. Instead, block 1115 is intended, as described for example, in FIGS. 12 and/or 13, to weight different portions or regions of a first scene when determining a brightness value for the first scene based on the pan direction.

In block 1120, exposure settings for the imaging sensor are adjusted based on the predicted brightness measurement of block 1115. In some aspects, the predicted brightness takes the form of a luma value, which is then used to adjust the exposure settings. In some aspects, the exposure settings may include one or more of an exposure time or a sensor gain adjustment.

In block 1125, a second image of the second scene is captured based on the adjusted exposure settings, such as gain or exposure. In some aspects, block 1125 may include writing the second image to an output device, such as a stable storage medium or a network. In some aspects, a portion of the second image within a field of view may be written to the stable storage, whereas portions of the second image outside the field of view may not be written to the stable storage.

In some aspects, process 1100 may be performed iteratively, such that the second image captured in block 1125 becomes the first image captured in block 1105, and process 1105 is then performed again for this second image.

In some aspects, a second brightness measurement of the second image captured in block 1125 may be determined. In some aspects, the second brightness measurement may be determined with equal weighting applied to each region of the image. In some aspects, this second brightness measurement may be compared to the brightness measurement determined in block 1115 for the second scene. In some aspects, a difference between the two brightness measurements may be utilized to refine the brightness prediction of block 1115 for future images. For example, in some aspects, adjustments to weights of regions of interest may be made based on differences in the brightness measurements.

In these aspects, the brightness prediction of block 1115 may rely on one or more previous brightness predictions generated in previous iterations of block 1115. For example, in some aspects, a prediction of a brightness of a scene generated in block 1115 may be compared to a measurement of actual brightness of the scene captured in block 1125. The actual brightness of the scene may be computed by equally weighting each region of the second image captured in 1125, whereas the prediction in block 1115 may have weighted regions of an image unequally when predicting a brightness of the scene. The difference between the predicted brightness determined in block 1115 and the actual brightness may be considered an error estimation of the prediction method of block 1115. In some aspects, the prediction determined in block 1115 may be based on the Equation 1 below:

$$Wn+1_{final}(x,y)=(1-\alpha)Wn^{predicted}(x,y)+\alpha Wn^{actual}(x,y) \qquad (1)$$

Where:
$W_{final}(x,y)$ is a weight of a region (x,y) used for brightness prediction
$W^{predicted}(x,y)$ is a weight of a region (x,y) determined in block 1115 based on the pan direction
$W^{actual}(x,y)$ is a weight of the region (x,y) without any modification based on pan direction.
$\alpha$ is a normalized error estimation of a difference between previous predictions of frame brightness and actual brightness of the frame. If multiple predictions are considered, they may be averaged or a median error may be determined and then normalized.

Thus, using the formula above, as error increases, the predicted brightness of the frame relies more on equally weighted regions of interest and less on regions of interest weighted based on a pan direction.

Figure 12:
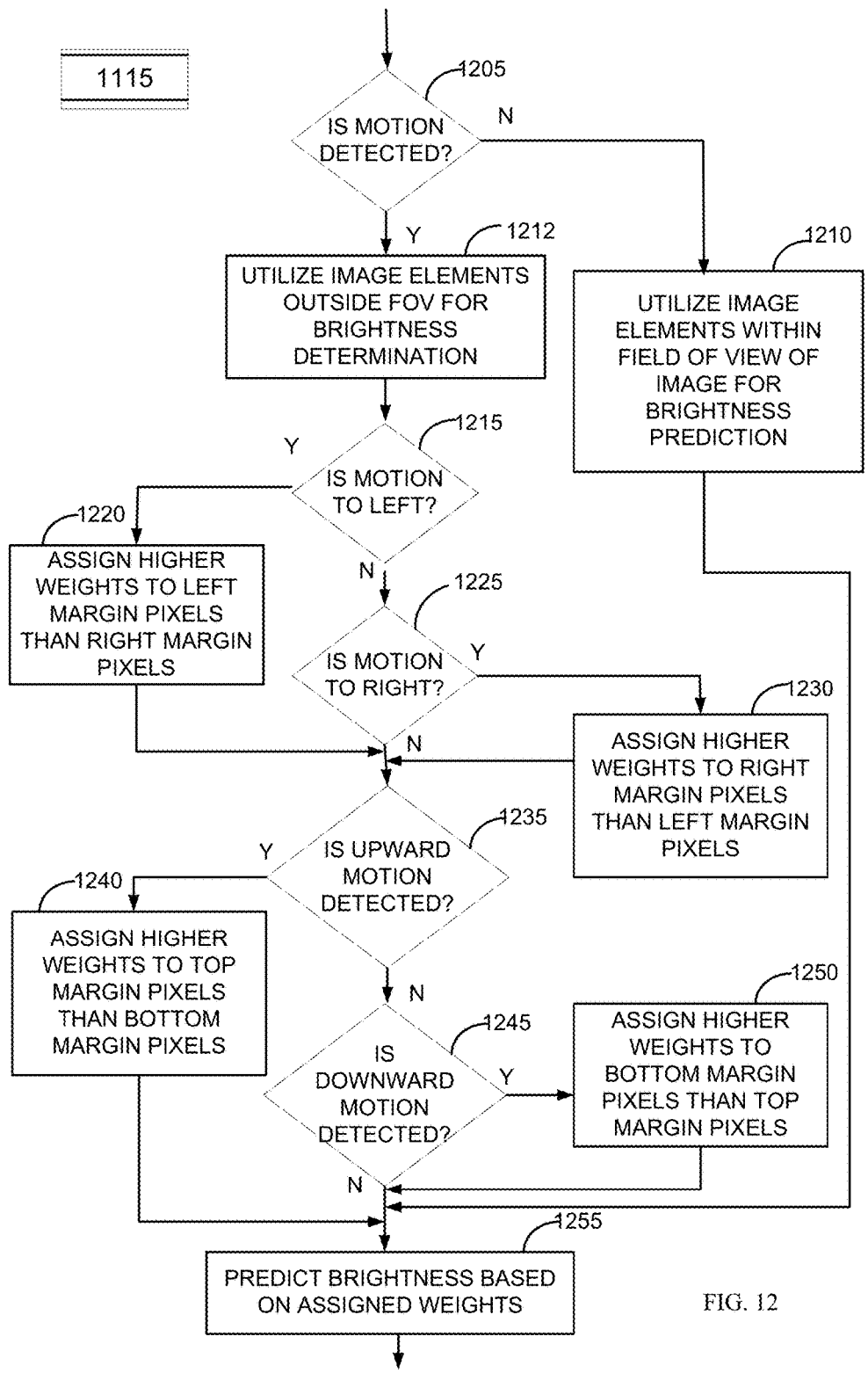
FIG. 12 is a flowchart of an exemplary embodiment of a process for predicting brightness of a second scene.

FIG. 12 is a flowchart of an exemplary embodiment of a process for predicting brightness of a second scene. In some aspects, the embodiment of process 1115 shown in FIG. 12 generates a luma value based on a captured image. The luma value generated by process 1115 may vary based on a direction of motion of an imaging sensor capturing the image.

Block 1205 determines whether any motion is detected. For example, block 1205 may consider measurements from the motion sensor 1010 to determine whether any motion has been detected during a past interval of time, indicating that the imaging sensor may be panning in a particular direction. If no motion is detected, process 1115 moves to block 710, which determines image elements within a field of view of the image may be used for a luma determination. For example, block 1210 may determine the luma value determined in block 1255, discussed below, is based on the luma values within the boundaries 310*a-b* of FIG. 4. The image elements within the boundaries 310*a-b* may be assigned equal weight in block 1210. Process 1115 then moves to block 1255, discussed below.

If decision block 1205 detects motion, process 1115 moves to block 1212, which utilizes image elements outside a field of view for brightness determinations. Contrast block 1212 with block 1210, discussed above, which utilizes only image elements within the field of view for brightness determination when no motion is detected.

After block 1212, process 1115 moves to decision block 1215, which determines whether the motion detected is to the left. If the motion is to the left, process 1115 moves to block 12720, which assigns higher weights to left margin pixels than to right margin pixels. For example, using the example of FIG. 4, if block 1215 detects motion according to arrow 410, image elements within the column 315*a* may be assigned higher weights than image elements within the column 315*b*.

If decision block 1215 does not detect motion to the left, process 1115 moves to block 1225, which determines if motion to the right is detected. If motion to the right is detected in block 1225, then process 1115 moves to block 230, which assigns higher weights to right margin pixels than left margin pixels. For example, applying the example of FIG. 4, if block 1225 detects motion according to arrow 405, image elements within the column 315*b* may be assigned higher weights than image elements within the column 315*a*. Process 1115 then moves to decision block 1235, which determines whether upward motion is detected. If upward motion is detected in decision block 1235, process 1115 moves to block 1240, which assigns higher weights to top margin pixels than to bottom margin pixels. For example, applying the example of FIG. 4, if decision block 1235 detects motion in accordance with arrow 415, then block 1240 may assign higher weights to pixels in row 315*d* than image elements in row 315*c*.

If decision block 1235 does not detect upward motion, process 1115 moves to decision block 1245, which determines if downward motion is detected. If downward motion is detected, process 1115 moves to block 1250, which assigns higher weights to bottom margin pixels than to top margin pixels. Again using the example of FIG. 4 for demonstration, if decision block 1245 detects motion in the direction of arrow 420, image elements in row 315*c* may be assigned higher weights than image elements in row 315*d*.

The embodiment of process 1115 of FIG. 12 then performs block 1255, which generates a brightness setting based on the weights assigned above. In some aspects, the brightness setting is a luma value for the image frame. The luma value may vary based on whether the imaging device capturing the frame is in motion or not, and based on the direction of the motion. In some aspects, the brightness setting is generated based on a weighted convolution filter. In some aspects, image elements outside the marginal areas may be given equal weight when determining a brightness measurement of the image frame. In the example of FIG. 4, this may include image elements within both the columns shown by dimension 310*a* and the rows shown by dimension 310*b*. Image elements not included in both dimensions 310*a-b* may be considered marginal image elements in the exemplary embodiment of FIG. 4. As discussed above, when no motion is detected, image elements within the margin regions, e.g. any image elements in columns 315*a-b* or rows 315*c-d*, may not be utilized in block 1255 for brightness prediction. When motion is detected, image elements in the marginal region may be utilized for brightness determination, according to their assigned weights discussed above.

Figure 13:
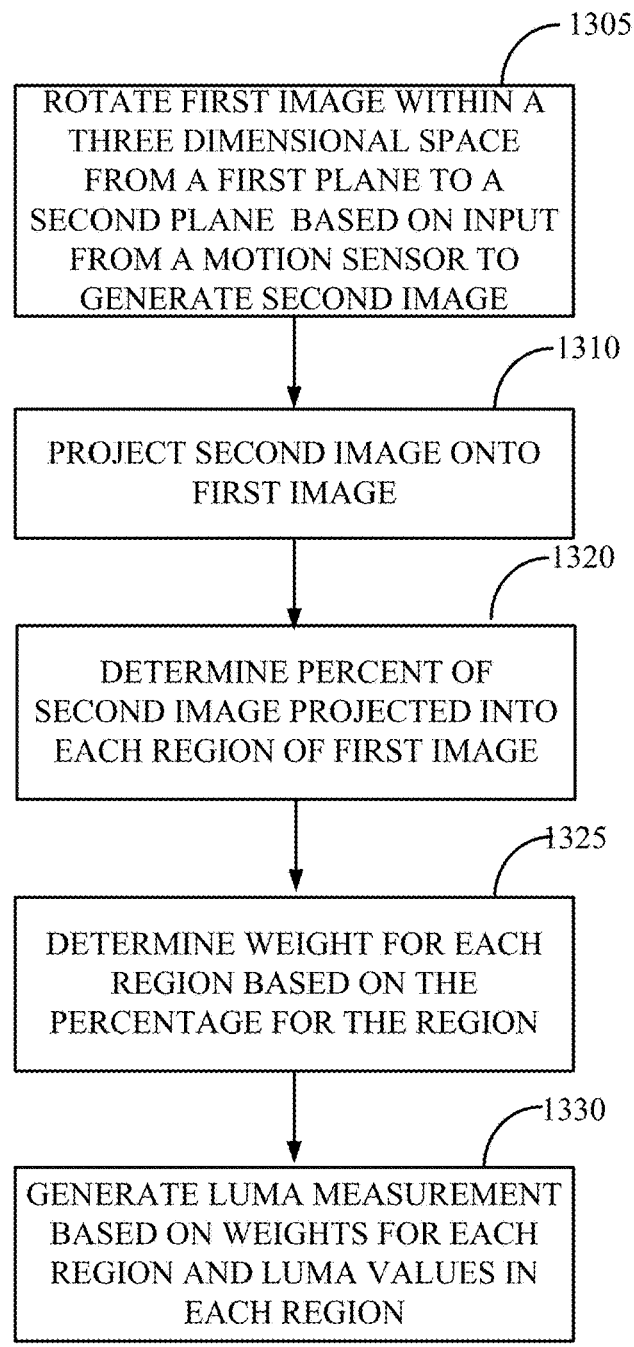
FIG. 13 is a flowchart of an exemplary embodiment of a process for predicting brightness of a second scene.

FIG. 13 is a flowchart for another embodiment of process 1115. In some aspects, the embodiment of process 1115 discussed below with respect to FIG. 13 may be performed by a hardware processor. For example, the memory 1025 may store instructions that configure the hardware processor 1015 to perform one or more of the functions discussed below with respect to FIG. 13.

In block 1305, a first image having a first orientation in a first image plane is rotated within a three dimensional space based on input from a motion sensor to generate a second image. For example, as discussed above with respect to FIG. 5, the image 502 may be rotated into a second three dimensional plane based on input from a motion sensor to form a second image 504 having a different second orientation in three dimensional space than the first image 502. The first image may be captured by an image element array. The image element array may include elements within a field of view and elements outside the field of view. Images within the field of view may be equivalent to the first image.

In block 1310, the second image is projected back onto the first image. For example, as shown in any of FIGS. 6-9, the rotated second image may be overlaid onto the first image via a projection of the second image back to the first image plane within the shared three dimensional space. Note that some implementations may not actually overlay one image onto another. Instead, mathematical operations may provide a correspondence between points of the second image and their respective locations within the first plane of the first image after the projection. For example, an area of the rectangular image 504 of FIG. 5 after projecting image 504 onto the plane of image 502 is given by $A_{proj}=L \times W \cos \beta$, where $\beta$ is an angle between a normal to the surface of the plane of image 504 and the normal to the plane of the image 502. This area is then overlaid on the image 502.

In block 1320, a percent of the second image in the second plane that is projected into a region of the first image in the first plane is determined. This may be determined for each region of the first image. As discussed above with respect to any of FIG. 6-9, the first image may be composed of a plurality of regions. When the second image is projected into the first plane, some portion of the second image in the second plane overlays a particular region of the first image. The particular region is weighted based on this percentage.

In other words, both the first region and the second are composed of regions. When the second image is projected back to the first plane of the first region, less than one region, one region, or more than one region of the second image may be projected into a single region of the first image on the first image plane. The collective portion of the second image projected into a region of the first image may determine the weight assigned to the region of the first image. This determination may be performed for each region of the first image In block 1325, weights are determined for each region of the first image element array based on the percentage overlaid by the projection of the second image onto the first image plane. In block 1324, a luma measurement for the first image is generated based on the weights determined in block 1320 and luma values in each of the regions.

In some aspects, a weight of a region of the first image may be expressed as:

$$W(x, y) = \sum_{a=1}^{a=m} \sum_{b=1}^{b=n} p(a, b) W2(a, b)$$

where:
m=number of rows or regions in the second image
n=number of columns of regions in the second image
P(a,b)=% of the region (a,b) of second image projected into region (x,y) of first image
W2(a.b)=weight of region (a,b) in second image.
Each W(x,y) may be normalized such that $$\sum_{x=n}^{x=m} \sum_{y=1}^{y=n} W(x, y) = 1$$

In some aspects, each region of the second image may have an equivalent weight. Thus, in these aspects, a weight of a region of the first image may be described as:
W(x,y)=% of second image projected into region (x,y).
Again each W(x,y) may be normalized such that $$\sum_{x=n}^{x=m} \sum_{y=1}^{y=n} W(x, y) = 1.$$

In block 1330, a luma measurement is generated based on the weights assigned to each region. For example, in some aspects, a luma estimate may be generated for each region. In some aspects, the luma estimates for each region may then be averaged based on the weights assigned in block 1325.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, the term "plurality" denotes two or more. For example, a plurality of components indicates two or more components. The terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. The term "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The various operations of methods described above may be performed by any suitable means capable of performing the operations, such as various hardware and/or software component(s), circuits, and/or module(s). Generally, any operations illustrated in the FIGS. may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of setting image capture parameters for an imaging sensor, comprising:
   capturing an image with the imaging sensor;
   determining a pan direction of the imaging sensor;
   determining an brightness measurement of the image based on the pan direction;
   adjusting a gain or an exposure time of the imaging sensor based on the brightness measurement; and
   capturing a next image using the adjusted image sensor gain or exposure time.

2. The method of claim 1, further comprising assigning higher weights to image elements within a first region of the image than weights assigned to image elements within a second region of the image in response to a first pan direction.

3. The method of claim 2, further comprising assigning higher weights to image elements within the second region of the image than weights assigned to image elements within the first region of the image in response to a second pan direction.

4. The method of claim 1, further comprising:
   determining a position of the image in a three dimensional space;
   generating a second image by rotating the image in the three dimensional space based on the pan direction;
   projecting the second image onto the first image;
   assigning a weight to each of a plurality of regions of the first image based on an amount the projected second image overlaps the region; and
   determining the brightness measurement based on the assigned weights.

5. The method of claim 4, further comprising:
   determining an area of the projected second image that overlaps with each region of the first image; and
   assigning the weights to each of the plurality of regions based on the area.

6. The method of claim 2, wherein determining the brightness measurement comprises applying a weighted convolution filter on luma values of image elements within each of the first and second regions according to the weights to determine a luma value for the image, and wherein the gain or exposure time is adjusted based on the luma value.

7. The method of claim 2, wherein the image includes image elements within a field of view and image elements outside the field of view, and the image elements within the first region and the second region are outside the field of view.

8. The method of claim 7, wherein the image elements outside the field of view are positioned in a contiguous portion of the image along four edges of the image.

9. The method of claim 2, further comprising:
determining a speed of the pan of the imaging sensor; and
weighting the image elements based on the speed.

10. The method of claim 1, wherein the first and second regions are outside a field of view of the image, and the method further comprises excluding image elements outside a field of view of the image from the brightness measurement when no motion is detected.

11. The method of claim 10, further comprising writing image elements within the field of view to a stable storage while excluding the image elements outside the field of view.

12. The method of claim 1, further comprising:
determining a second brightness of the next image;
determining an error between the brightness measurement of the first image and the second brightness;
determining a second pan direction of the imaging sensor;
determining an adjusted brightness of the next image based on the second pan direction and the error;
second adjusting the gain or the exposure time of the image sensor based on the brightness measurement, and
capturing a further image with the image sensor using the second adjusted image sensor gain or exposure time.

13. The method of claim 1, wherein determining the pan direction comprises:
determining a pan direction along a first axis; and
determining a second pan direction along a second axis, wherein the brightness measurement is further based on the first and second pan directions.

14. An apparatus for adjusting image capture settings for an imaging sensor, comprising:
a camera, the camera including an image sensor configured to capture one or more images;
a motion sensor, configured to measure a pan direction of the image sensor;
a hardware processor, configured to:
receive an image of the one or more images from the image sensor,
determine a pan direction of the image sensor based on input from the motion sensor,
determining a brightness measurement of the image based on the pan direction,
adjust a gain or an exposure time of the image sensor based on the brightness measurement, and
capture a next image with the image sensor using the adjusted image sensor gain or exposure time.

15. The apparatus of claim 14, wherein the hardware processor is further configured to:
determine a position of the image in a three dimensional space,
generate a second image by rotating the image in the three dimensional space based on the pan direction,
project the second image onto the first image,
assign a weight to each of a plurality of regions of the first image based on an amount of the projected second image that falls within the region, and
determine the brightness measurement based on the assigned weights.

16. The apparatus of claim 15, wherein the hardware processor is further configured to:
determine a luma measurement for each of the plurality of regions of the first image, and
determining the brightness measurement for the image by averaging the luma measurements based on the assigned weights.

17. The apparatus of claim 15, wherein the portion of the plurality of regions of the first image are within a field of view and a second portion of the plurality of regions is outside the field of view.

18. The apparatus of claim 17, wherein the hardware processor is further configured to store the portion of the plurality of regions within the field of view to a stable storage device, while excluding the regions outside the field of view.

19. The apparatus of claim 15, wherein projecting the second image onto the first image comprises projecting a portion of the second image onto a region outside a field of view of the first image, and assigning a weight to the region outside the field of view of the first image based on the portion of the second image being projected into the region outside the field of view.

20. The apparatus of claim 14, wherein the electronic hardware processor is further configured to:
determine a second brightness of the next image;
determine an error between the brightness measurement of the first image and the second brightness;
determine a second pan direction of the imaging sensor; and
determine an adjusted brightness of the next image based on the second pan direction and the error,
second adjust the gain or the exposure time of the image sensor based on the brightness measurement, and
capture a further image with the image sensor using the second adjusted image sensor gain or exposure time.

21. A non-transitory computer readable medium comprising instructions that when executed cause a hardware processor to perform a method of adjusting exposure settings of an imaging sensor, the method comprising:
capturing an image with the imaging sensor;
determining a pan direction of the imaging sensor;
determining a brightness measurement of the image based on the pan direction;
adjusting a gain or an exposure time of the imaging sensor based on the brightness measurement; and
capturing a next image using the adjusted image sensor gain or exposure time.

22. The non-transitory computer readable medium of claim 21, the method further comprising:
determining a position of the image in a three dimensional space,
generating a second image by rotating the image in the three dimensional space based on the pan direction,
projecting the second image onto the first image,
assigning a weight to each of a plurality of regions of the first image based on an amount of the projected second image that falls within the region, and
determining the brightness measurement based on the assigned weights.

* * * * *